C. F. Voorhies.
Printing Press.
№ 8139X
Patented Apr. 8. 1834.
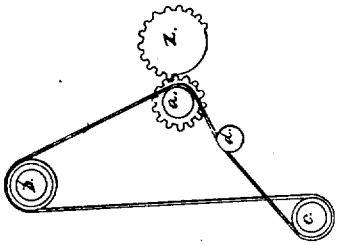
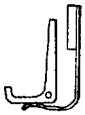
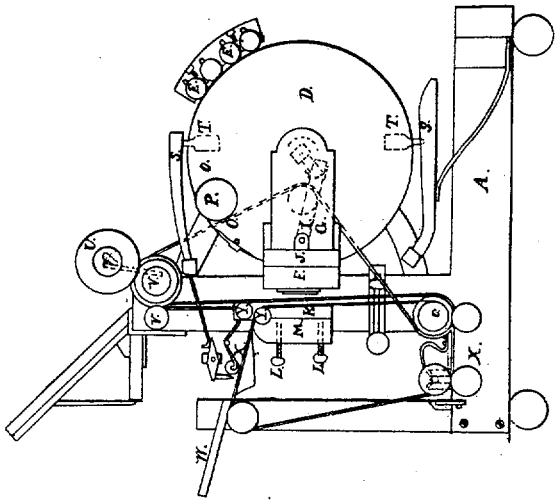
Sectional Views.
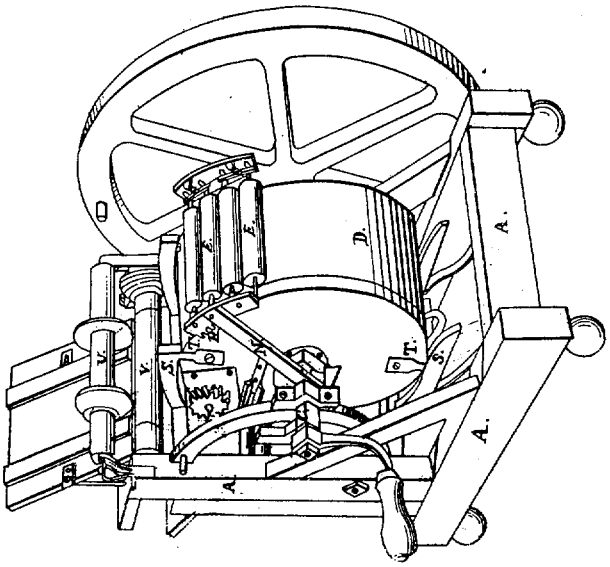

7/8/1834 8139X

Ai

Apl. 8. 1834 25

8139X

Charles F. Voorhies
Letters Patent
Printing Press
April 8. 1834.

The schedule referred to in these Letters Patent and making part of the same
containing a description in the words of the said Charles F. Voorhies himself of
of his improvement in the machine for Printing

---

To all whom it may concern. Be it known that I Charles F. Voorhies of New
ark in the County of Essex and State of New Jersey have invented a new
and useful machine for printing and I do hereby declare that the following
is a full and exact description thereof reference being had to the drawings
which accompany and make a part of this specification. Fig 1. is a pers
pective view of the whole machine and Fig 2. a vertical section taken long-
itudinally. In both these figures the parts which correspond are marked with
the same letters of reference. As this machine is intended to be made both for
large and small work I do not deem it necessary to give the dimensions of the
respective parts as a competent machinist will readily proportion these to
suit the required purpose from the printing of single cards, to that of the larg
est kinds of book work. The frame A A may be made in different forms, that
represented in the drawing however I esteem convenient. The semicircular
piece B. with a corresponding piece on the opposite side supports the shaft C
which passes through and revolves within the inking cylinder D and has a fly
wheel on its opposite end to regulate the motion. When the press is at work
this cylinder is stationary, its use being to sustain the form and to distribute
the ink regularly upon the inking rollers E E. The form is placed vertically
and is fixed by screws, wedges or otherwise, in a frame, seen in section at F.
The two ends of this frame are attached to sliding pieces at each end of the
cylinder D. One of which is shown at G figure 2. These sliding pieces serve
as guides to the form, being retained in their places by proper grooves. The
shaft C has on it two cranks H. close to the heads of the cylinder D which
by means of two connecting rods I. jointed to the piece J. carry the sliding piece
s and the form [illegible] and forward. K. is a section of the platten which
is stationary, but may be set so as to regulate the pressure by means of the screws

R.H.

8139X

L L working through a part of the frame M. The inking rollers E, E, are
carried round the cylinder D by means of arms, one of which is shown at
N. fastened at one end to the shaft C. and at the other to the frames which
support the inking roller. The gudgeons of these rollers work in slots in
the frame, being borne down by means of spiral or other springs, so as to keep
them in contact with the cylinder D. and to force them down upon the type
as they pass over the form. Although the large surface of the cylinder D. over
which the inking roller pass will in general suffice to distribute the ink
equally upon them. I intend sometimes to give to one or more of these roll
ers a lateral motion which may be effected in various ways. The ink is
to be contained in a reservoir O formed in the cylinder D. and reaching from
one end of it to the other. Within this reservoir there is a supply roller P. one
part of the periphery of which projects out above the surface of the cylinder D.
The pinion Q. is upon one of the gudgeons and as the inking rollers revolve
the teeth R on the under edge of their frame give to the roller a partial re
volution. A latch which checks the pinion being lifted by a pin on the arm
N. at the moment the teeth are to engage with the pinion; this latch is shown
separately at figure 4. Contrivances similar to those now in use may be employ
ed to regulate the portion of ink which shall be brought round by this roll-
er; this however may be in a great measure effected by the distance of its mod-
ulation every time the inking rollers pass over it. The latches S, S. catch upon
pins T, T and hold the cylinder D in its place. These raise alternately when
the frame of the inking roller comes in contact with them, and thus allow it
to pass. When the form is to be examined or removed both these latches are to be
raised and the cylinder D will then turn on its shaft so as to allow the form
to be brought into a horizontal position. I intend by means of this machine
to print either on separate sheets in the ordinary way or to use a continu-
ous sheet of any length that can be conveniently wound upon a roller.
The mode of feeding or laying on the sheet, must of course be adapted to their
different purposes. A continuous sheet may be wound upon a roller U im-
mediately above the form and be conducted down between the feeding
rollers V, V. or sheets may be fed from a board or shelf W. as is common in
cylinder presses on to an endless apron X. and between rollers Y, Y. The sheets

8139X sheets are kept in their places against the endless apron by cords or strings in
a manner well known in other presses. Fig. 3. shows the manner in which
the motion is communicated from the shaft C. to the feeding rollers and to
the endless apron Z. is a segment wheel on the shaft, the teeth on which take
into the wheel a. having on it a grooved whirl to receive a band. this band
may pass round a whirl, with graduated grooves on the roller b. which is the
same as U. in figs 1&2. The roller c. round which it is also shown as passing
carries the endless apron X. d is a pulley for tightening the band. Whilst
the blank part of the segment wheel Z. is passing round the feeding rollers,
endless apron, and holding cords remain at rest. and the impression is
then given by the advancing of the frame against the platten; this occur-
ring when the cranks on the shaft C. are towards the form. The inking roll-
ers pass over the form, when the cranks are in the reverse position; the faces
of the type then most nearly coinciding with the surface of the cylinder D.
When I print upon a continuous sheet. I intend to divide the same as it is
delivered from the form by means of a knife or of perforating points which
may be arranged in various ways to operate at the right time. This however
being a thing of arrangement only and not affecting the general prin-
ciples upon which the machine operates I do not deem it necessary to de-
signate any particular mode of effecting this object. It will readily be
perceived that although I have represented this Press as operating upon
one form only a second may be added on the opposite side, and furnished
with all the apparatus required for its action, as in that described.
This second form will receive its ink from the same roller as the first and
the two may be worked by a power considerably less than that which would
be required for the single form. What I claim as my Invention and for
which I ask a patent is the general construction of the before described ma-
chine. Many of the separate parts of which it consists are similar to those
heretofore employed in printing and other machines. and these therefore I
do not claim as my invention. But I do claim the inking cylinder
with the inking rollers revolving round it in the manner and for the
purposes herein set forth. I also claim the manner of fixing and operating
upon the form by the cranks upon the shaft which passes through the centre of the inking cylinder. I likewise claim the general arrangement of the whole machine from which it receives that peculiar character by which it is distinguished from all others intended for a similar purpose Witnesses Thos P. Jones Jos. Onarang Charles F. Voorhies Drawing 1500 wds

C.L.

Ch.F.W.